United States Patent [19]

Metcalfe et al.

[11] Patent Number: 4,600,414
[45] Date of Patent: Jul. 15, 1986

[54] APPARATUS FOR REMOVING CONTAMINANTS FROM HEATED GASES

[75] Inventors: Arthur G. Metcalfe, National City; James C. Napier; William A. Compton, both of San Diego, all of Calif.

[73] Assignee: Solar Turbines Incorporated, San Diego, Calif.

[21] Appl. No.: 684,051

[22] Filed: Dec. 20, 1984

Related U.S. Application Data

[62] Division of Ser. No. 434,103, Oct. 13, 1982, Pat. No. 4,568,365.

[51] Int. Cl.$^4$ .............................................. B01D 45/08
[52] U.S. Cl. ........................................ 55/290; 55/315; 55/296; 55/524; 110/216
[58] Field of Search ................. 55/1, 96, 97, 290, 400, 55/315, 462, 267, 524, 296; 110/216; 427/423

[56] References Cited

U.S. PATENT DOCUMENTS

| | | | |
|---|---|---|---|
| 2,639,780 | 5/1953 | Hardy | 55/290 |
| 3,063,216 | 11/1962 | Silverman | 55/96 |
| 3,675,393 | 7/1972 | Meade | 55/96 |
| 3,834,493 | 9/1974 | Hubert | 55/462 |
| 3,853,506 | 12/1974 | Pircon | 55/96 |
| 4,099,481 | 7/1978 | Lyons | 427/423 |
| 4,193,777 | 3/1980 | dela Riviere | 55/96 |
| 4,264,341 | 4/1981 | Kaufman et al. | 55/96 |

FOREIGN PATENT DOCUMENTS 2628222 1/1978 Fed. Rep. of Germany .
7106585 11/1971 Netherlands ............................ 55/97

Primary Examiner—Bernard Nozick
Attorney, Agent, or Firm—Hughes & Cassidy

[57] ABSTRACT

Methods of and apparatus for removing contaminants from heated gases by impact separation. The contaminants are collected by adhering them to a moving surface, and they are thereafter removed from that surface.

21 Claims, 6 Drawing Figures

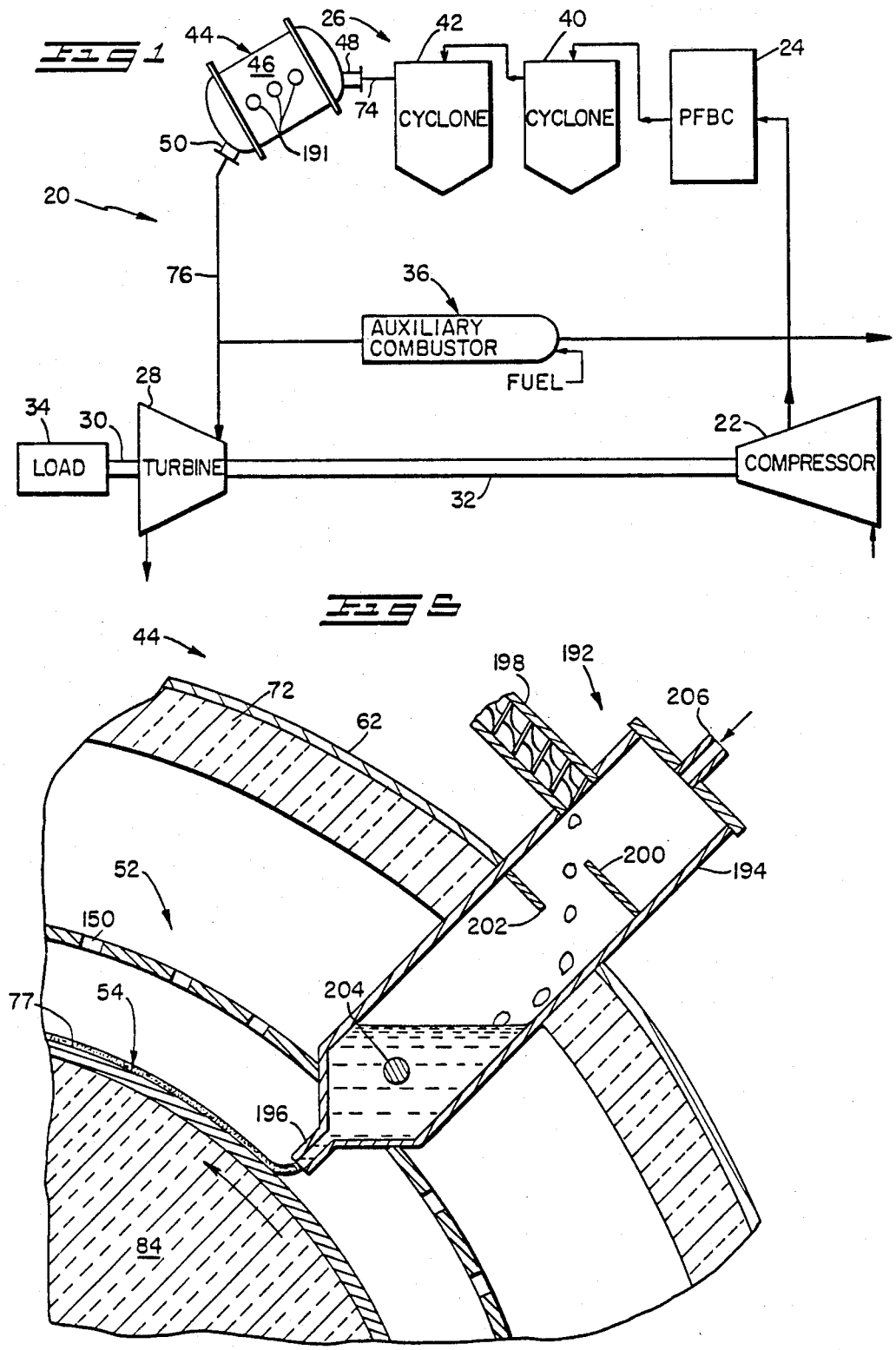

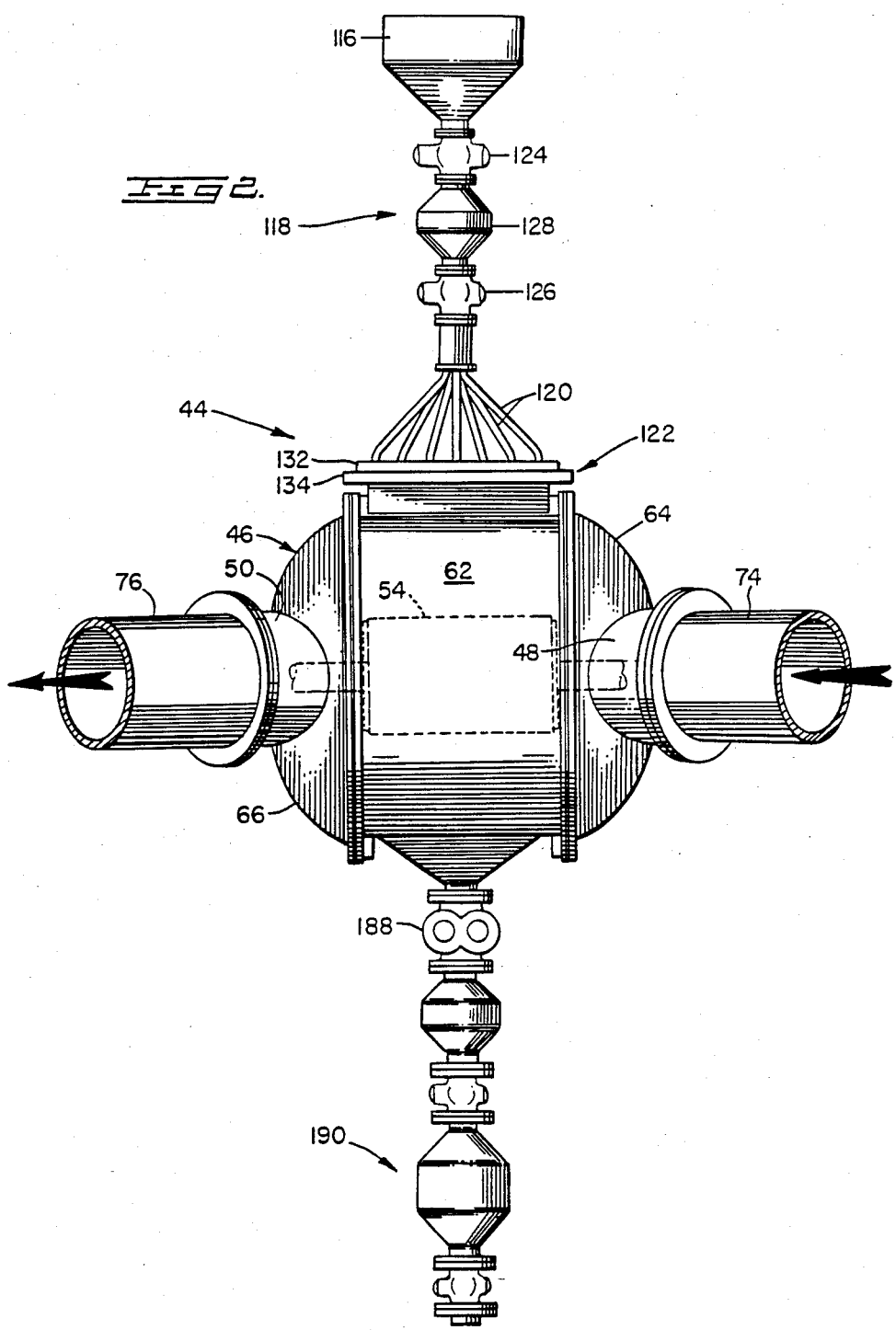

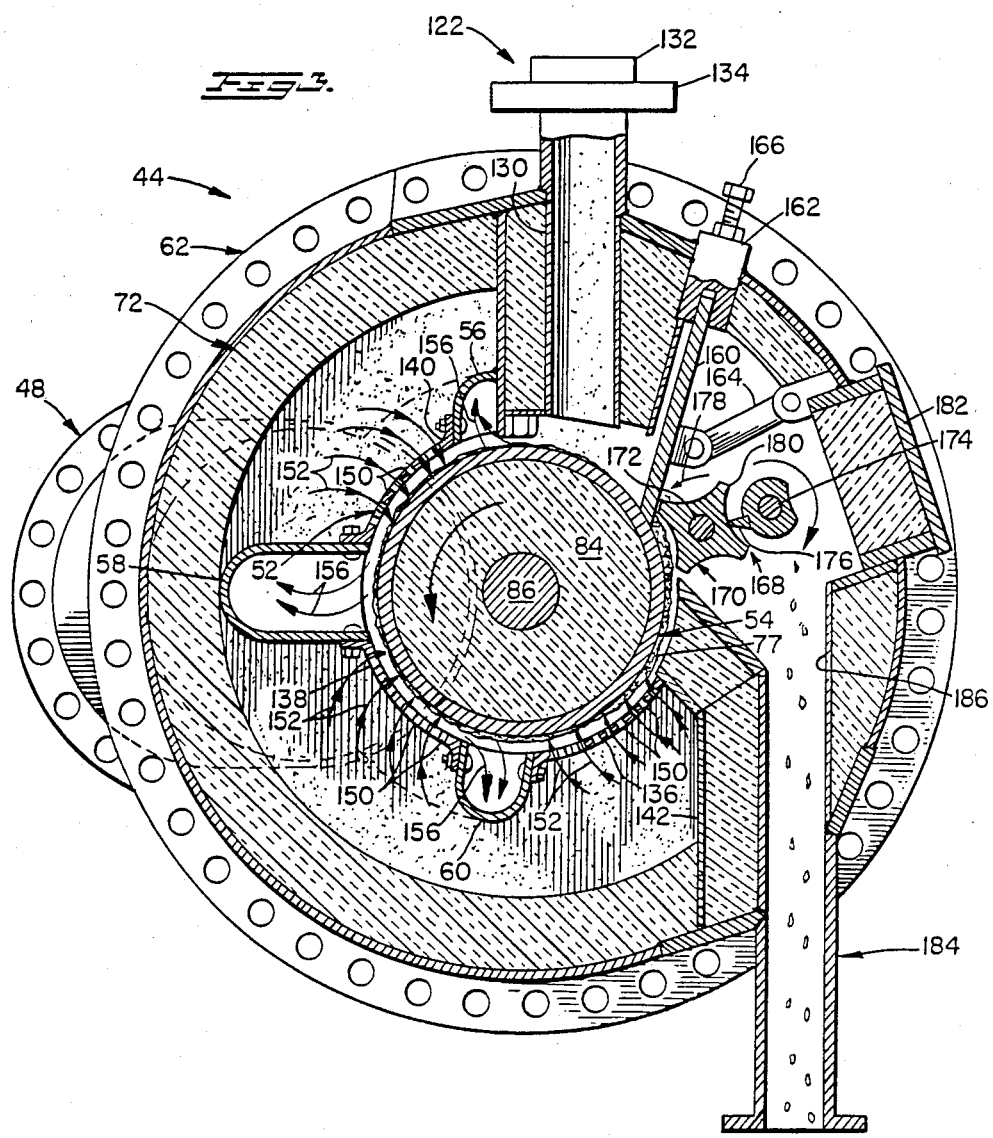

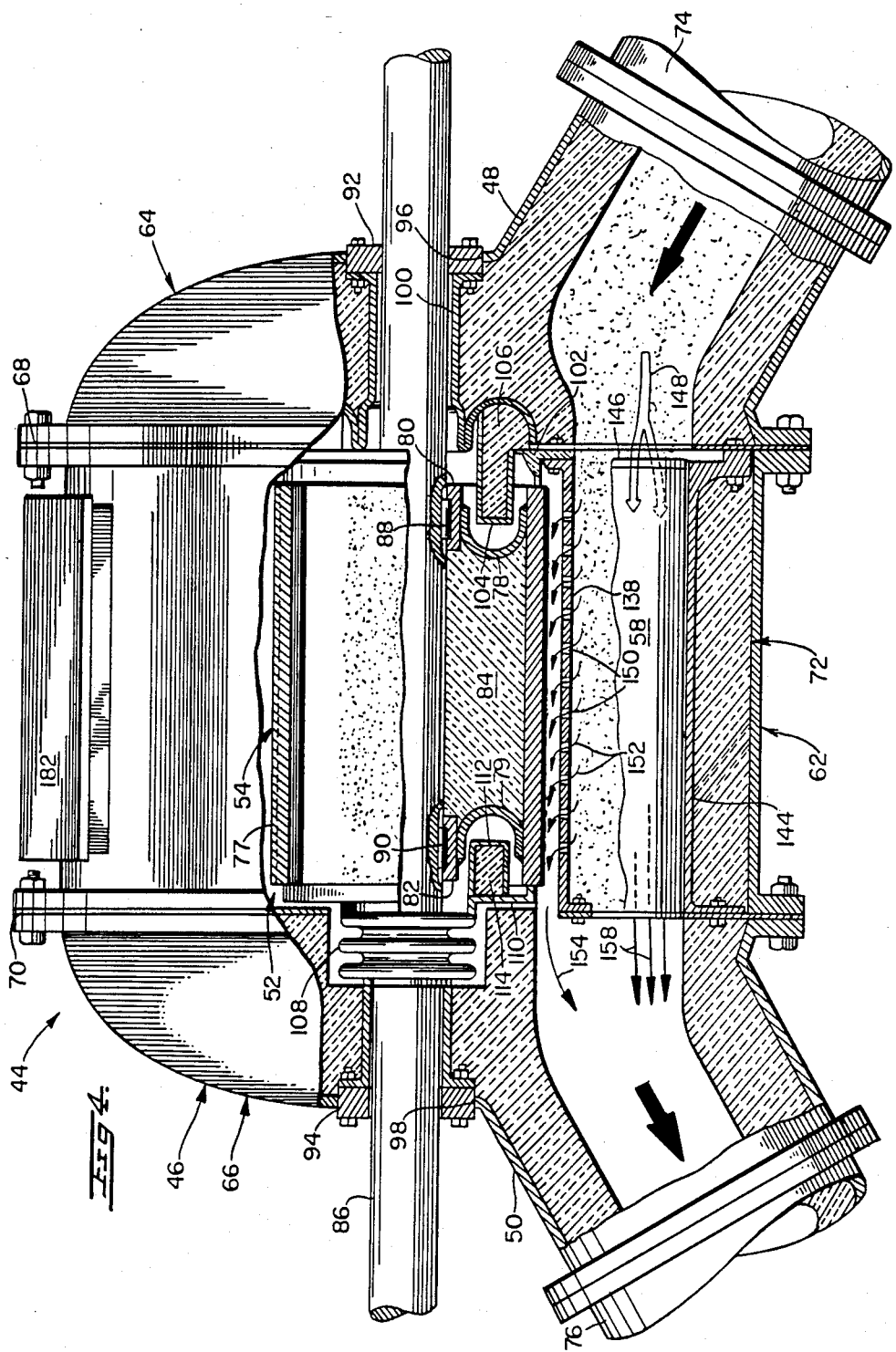

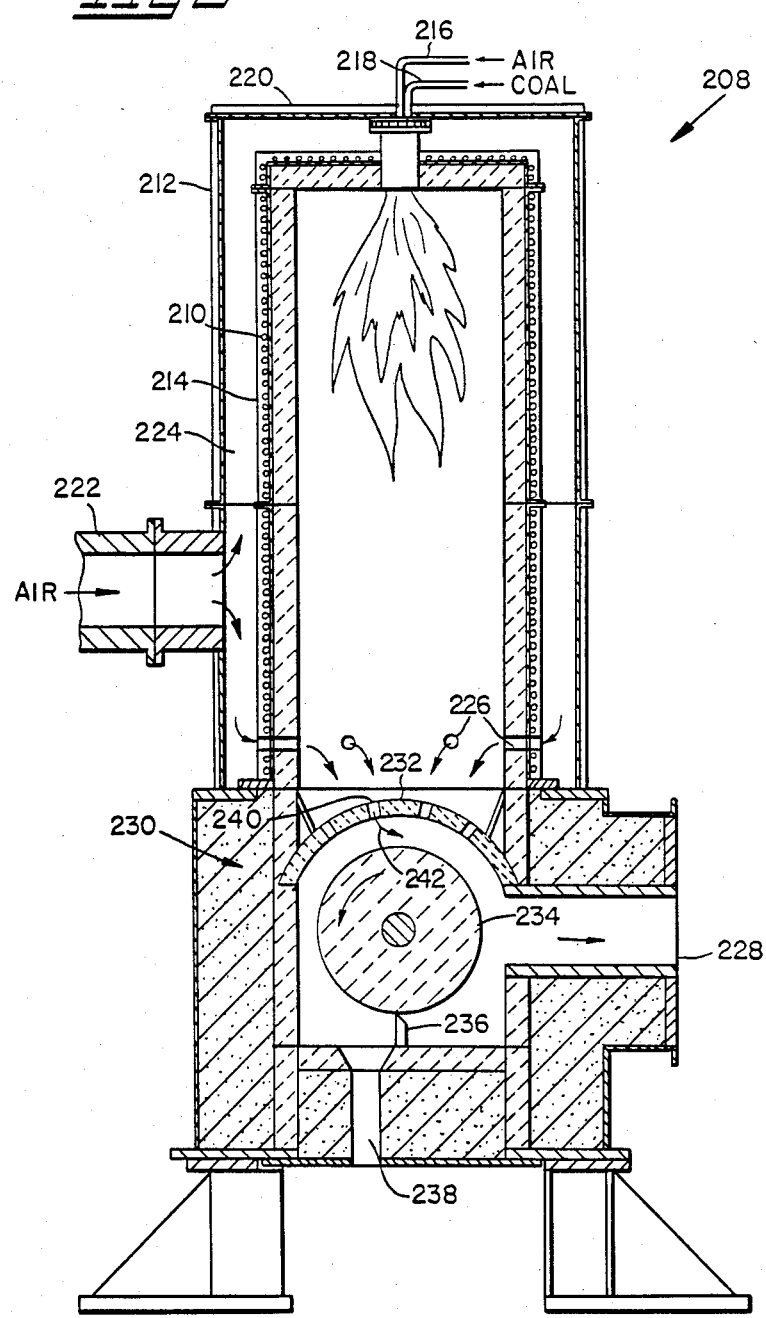

APPARATUS FOR REMOVING CONTAMINANTS FROM HEATED GASES

This is a division of application Ser. No. 434,103, filed Oct. 13, 1982, now U.S. Pat. No. 4,568,365.

TECHNICAL FIELD

The present invention relates to methods of and apparatus for removing particulate contaminants from heated gases and, more particularly, to novel, improved methods and apparatus of the impact separation type for effecting hot gas clean-up.

Such methods and apparatus can be used to advantage to remove particulate contaminants from the hot gases (or working fluid) supplied to the turbine of a gas turbine engine of the internal combustion type. The principles of the invention will accordingly be described primarily with reference to that application with the understanding that this is being done for the sake of clarity and convenience and is not intended to limit the scope of the invention as defined in the appended claims.

BACKGROUND OF THE INVENTION

Consistently increasing costs of petroleum and natural gas and concern about the continued availability of those energy sources and dwindling reserves of them have led many larger scale consumers of energy to explore alternate sources of energy such as oil shales and tar sands; solar, wind, wave, tidal, and goethermal energy; and nuclear energy (especially breeder reactors). Also, much attention has been focussed on the increased use of coal, once this world's dominant energy source, because of the huge reserves of that fuel. Also, while coal has a number of drawbacks as an energy source—environmental degradation and atmospheric pollution, health, safety, transportation, storage and waste (ash) disposal problems—so do the alternative energy sources identified above, and they are consequently not widely considered as viable alternatives to coal at the present time in most energy consuming applications. Research into methods of utilizing coal that will minimize its negative characteristics have consequently been continued and perhaps even intensified.

One approach to the utilization of coal as an energy source that is currently receiving attention is fluidized bed combustion. In that technique the bottom of a combustor is filled with a bed of a granular, inert, particulate material (sand, limestone, and ash are commonly used); and air is blown upwardly through the bed, converting it into one that to some extent has properties akin to those of a fluid. Coal (or other fuels) can be fed into, and burned in, a fluidized bed, liberating thermal energy that can be used for any of a variety of purposes.

Additives can be used to control unwanted emissions from a fluidized bed combustor. For example, if crushed limestone or dolomite is fed to the fluidized bed with a sulfur-containing coal, the sulfur will react with the calcium in the additive to form calcium sulfate. This is a solid and can be removed from the combustor with the ash generated in the combustion process.

In more recent years the fluidized bed has on occasion been housed in a pressurized shell, making the combustor capable of generating gases which can be used to drive the turbine(s) of a gas turbine engine. Consequently, the use of a pressurized fluid bed reactor to generate the working fluid for a gas turbine engine offers an opportunity for lessened dependence on such sources of energy as imported oil and natural gas.

Pressurized fluid bed combustors are efficient and can be made capable of producing gases which are low in $NO_x$ and sulfur content; e.g., by employing appropriate additives as described above. However, contamination of the product gases with other substances which are capable of causing turbine degradation by erosion, fouling, and hot corrosion remains a problem in gas turbine engine applications. Both hard and soft (and molten) particles in the gases can cause erosion of turbine components while soft particles of materials such as calcium sulfate cause fouling, and other substances such as sodium sulfate cause hot corrosion. As a result, turbines operated on gases generated by the combustion of solid fuels have heretofore not had an acceptable service life.

BACKGROUND ART

Several techniques for cleaning up or eliminating contaminants from gases have been proposed. Among these is filtration. Fundamentally, filtration involves gravitational settling, interception, impact separation, and diffusion. In general, filtration processes suffer from several disadvantages. They are typically a statistical and variable process and have a "weakest link" character. Leakage and reentrainment of particles are also problems, and the area required for filtration is usually very large. This is particularly disadvantageous in gas turbine engine applications as the hot gas clean-up apparatus must be housed in a pressure vessel.

Other separation techniques that have been proposed involve the use of cyclone separators, electrostatic precipitators, and molten glass scrubbers.

Electrostatic precipitators have been rejected because of cost, size, and lack of flexibility. Also, alkali metals are apt to be ionized and injected into the gases being cleaned; reentrainment is a problem; and they are inefficient as far as particles with high conductivity (such as carbon) and high resistivity (such as silica) are concerned.

Molten glass scrubbers have the disadvantage that the ratio of glass to collected materials is in the ten to one range which makes the process expensive. This is compounded by the lack of low-cost glasses having suitable viscosities at the 760° to 927° F. range involved in gas turbine engine applications. Also, molten glass scrubbing is statistical as contact between the glass and particles of contaminants depends upon chance.

Cyclones are very inefficient in separating particles of a size below five microns. This is significant because one manufacturer has stated that 99+percent of all particles two microns in size and larger must be removed to make a gas an acceptable working fluid for gas turbine engines.

DISCLOSURE OF THE INVENTION

It has now been discovered that use can be made of impact separation, one of the most efficient of the filtration processes, to remove contaminants from (or clean up) hot gases such as those generated in a coal fired combustor. In this application of impact separation the hot gases are accelerated and then turned through an angle which may be on the order of 90°. Only the very smallest particles can make the turn. The rest of the particles continue in a straight line or shallow curve and are trapped on a moving collector such as a rotating drum or an endless belt, and clean gases are consequently made available for whatever purpose may be at hand. Contaminants trapped on the moving target are subsequently removed in a zone which is isolated from the impact separation zone so that contaminants will not be reentrained in the cleaned gases.

Typically, one, or preferably two, conventional cyclones will be employed ahead of the impact separator in the hot gas clean-up scheme. The cyclones are employed to separate out ten micron and larger particles (which they can do efficiently), thereby reducing the burden on the impact separator.

At typical operating temperatures (e.g., 760°–927° C.), the particulate particles may be soft enough to stick to the collector without aid. If not, adherence can be promoted by coating the collector with a material that will be sticky at the temperature at which the gas cleaning process is carried out. Glasses and vitreous enamels are acceptable coating materials with glasses typically being preferred because of cost considerations.

To be useful, the candidate material should have a viscosity of $10^3$–$10^5$ poises at operating temperature. Glasses with lower viscosities will be blown off the surface on which they are deposited by the impinging hot gases. Glasses with viscosities above the indicated limit are not sticky enough to trap the separated foreign substances; or, if they are, not viscous enough to enfold the entrapped particles. That is undesirable; the enfolding of trapped particles exposes additional glass, making it possible to trap multiple layers of contaminants and thereby increasing the contaminant trapping capacity of a given amount of glass.

For the same reason gassy and porous glasses are preferred. The contaminants can break into the bubbles of gassy glasses and penetrate into the pores of porous glasses, producing a similar enfoldment of the contaminant.

Ordinary soda lime silica glasses (approximately 75% silica, 13% sodium oxide, and 12% lime) are desirable candidates because of their wide availability and low cost although they are typically somewhat too viscous. However, such glasses can be made satisfactory by adding appropriate modifiers. For example, by adding sodium and calcium carbonates to a soda lime silica glass to increase its content of CaO and $Na_2O$, the composition of a soda lime silica glass can be adjusted to 64% $SiO_2$-19% $Na_2O$-17% CaO, which has approximately the wanted viscousity at a typical turbine inlet temperature of 899° C.

Decreases and increases of monovalent cations and anions, especially flouride, can also be employed. Flourides are particularly effective in glass viscosity control.

A mixture of glass and/or vitreous enamel frits can also be employed to advantage. For example, powdered, low cost soda lime silica glass scrap can be mixed with a lower melting point, more fluid frit or glass of the composition 50% $SiO_2$-20% CaO-20% BaO-10% $B_2O_3$ to provide a glass that will have an appropriate viscosity at typical turbine inlet temperatures.

Mixtures as described of three glasses are also advantageous in that the porosity of the glass can be controlled. This is important because, as mentioned, porous glasses can be penetrated to a significant extent by impacting particles, substantially increasing the amount of contaminants a given quantity of glass can retain.

The glass can be sifted onto the collector. In this case the frit should have a minimum size of 0.5 mm so that it will not be entrained into the gases being cleaned. Also, one or more rollers can be used to regulate the thickness of and level the glass, to minimize the loss of frit, and to minimize any gas flows that might interfere with the application of the frit.

As an alternative, flame spraying can be employed to apply the glass or frit to the moving target. While this requires both oxygen and hydrocarbon fuel, cost and energy comsumption levels are acceptable as the application will be made to a collector at an elevated temperature.

Another system that can be employed to supply the glass includes an arrangement resembling a caulk gun. That arrangement has a pressurized hopper to which the glass is fed in particulate form (typically in a size consist of $\leq 50$ mesh$\times 0$). The hot gases in the impact separator, supplemented with an immersion heater in the hopper, melt the glass. The molten glass is then driven from the hopper through an elongated nozzle onto the surface of the moving contaminants collector.

An air cooled doctor blade or knife can be employed to separate the contaminant-loaded glass from the contaminants collector in the removal zone. If desired, a Geneva mechanism and/or contrarotating rolls can be used to crush the glass/ash mixture into pieces that can be readily handled.

Applicant's novel hot gas impact separator is designed for particulate removal. However, alkali metals, vanadium, lead, and other contaminants are also removed as are inert solids, molten droplets, and volatile species absorbed on solids. Also alkali metal is removed by virtue of silica gettering which involves the reaction $$2NaCl + H_2O + 2SiO_2 \rightarrow Na_2Si_2O_5 + 2HCl.$$

This makes the alkali metal unavailable as far as its ability to produce hot corrosion is concerned.

Also, the removal of particulate contaminants minimizes the reversion of alkalis to harmful species by reaction with acidic gases. For example, the removal of solid particles can prevent the reaction $$NaAlSi_3O_8 + SO_3 \rightarrow Na_2SO_4(harmful) + Al_2O_3SiO_2 + 2SiO_2$$

In addition, in those applications of the invention employing glass or vitreous enamel to trap contaminants, reactions between the alkali metal vapors and a low alkali will cause a further reduction in the alkali metal content of the cleaned hot gases.

The capacity of the novel impact separators disclosed therein to separate vapors containing alkali metal contaminants from the hot gases being cleaned is especially important in turbine engine applications because the vapors that condense in the turbines of such engines tend to be those that will induce hot corrosion via the formation of a molten surface layer. Important contaminants in this category include the akali sulfates.

It has also been discovered that the efficiency of the novel hot gas clean-up process disclosed herein can be increased (and the need for coating the contaminants collector perhaps eliminated) by having small amounts of finely divided ash from a strong fouling coal present in the hot gases being cleaned to promote adherence of the contaminants to the contaminants collector. The agglomerating ash can be provided by adding the strongly fouling coal in finely divided form (size consist of ca.200 microns) to that coal which is the primary fuel in a coal-fired combustor. Ash generated by burning the strong fouling coal will typically be less than 10 microns in size and will accordingly not be removed to a significant extent by the cyclones typically employed ahead of the herein disclosed impact separator apparatus to remove the larger particles in the hot gases being cleaned.

The amount of the agglomerating ash from the fouling coal should typically about equal that of the ash from the primary fuel in the hot gases reaching the impact separation apparatus.

One of many suitable coals which can be burned to produce an agglomerating ash is Illinois No. 10. This ash initially deforms at 1041° C. and softens at 1063° C. and has a fluid temperature of 1085° C.

Numerous important advantages of the present invention have been discussed above. Another important advantage of the novel hot gas clean-up apparatus described herein is that energy losses are very low. Total energy losses (which include parasite power consumption) of not more than approximate two percent can be expected.

Because the novel hot gas clean-up apparatus described herein has large, multiple, high velocity pathways for the fluid being cleaned, it is compact. This is important because compactness reduces the size and cost of the containment (or pressure) vessel of the apparatus and, also, keeps heat losses low, contributing to the minimization of energy losses.

Blockage of fluid passages can be expected in the operation of virtually every type of gas clean-up device. In most devices of that character, including those employing the heretofore common techniques—filtration, diffusion enhanced (electrostatic precipitation, for example), and scrubbing—blockage produces drastic decreases in efficiency because the effect of blockage is increased with the throughput velocity of the gases being cleaned, and increased velocity markedly decreases the efficiency of the separation techniques enumerated above.

In contrast, efficiency of the novel impact separation type clean-up devices disclosed herein actually increases under partial blockage because the efficiency of impact separation increases in proportion to the velocity of the gases being processed. This is important as it materially reduces in magnitude (and cost) the heretofore major requirement for removing the passage or pore clogging particulates from the separation apparatus (on the other hand, the increase in velocity causes the pressure drop in the separator to increase so that the increased efficiency takes more energy from the system).

A related advantage of the apparatus is that, even though particulate material may accumulate on the upstream side of the component in which the fluid passageways are formed, the scouring action of the particulate material carried by the hot gases thereafter flowing through the passageways will keep the buildup from increasing beyond a certain level, thereby keeping the passageways open.

Another advantage of the novel hot gas cleanup apparatus under discussion is that it exhibits good tolerance toward system malfunction. For example, it was pointed out above that cyclones may be employed ahead of the impact separation apparatus to remove the bulk of the larger particles from the gases being cleaned. Cyclones are notoriously subject to clogging. This clogging, however, will typically not affect the capabilities of the impact separation apparatus to an extent requiring shutdown of the hot gas clean-up system and cleaning of the cyclones unless it becomes unusually severe.

A not unimportant side benefit of the novel hot gas clean-up apparatus described herein is that the cleaned gases it generates are well within the emission standards in existence and proposed by federal, state, and local rule-making bodies for gas turbine engine operation. In fact meeting such standards is not a significant problem at all because the limitations on contaminants in such gases required for an acceptable turbine service life are more demanding than the emission standards.

Still another important advantage of the novel hot gas clean-up apparatus described herein is that the performance of the apparatus can be readily varied simply by changing the members in which the impact separation throughput passages are formed to alter the size of those passages and/or by varying the pressure drop across the passages. This flexibility is important as permissible levels and types of contaminants and the composition of the hot gases being cleaned can vary widely from installation to installation. For example, the use of recycling to increase combustion efficiency in pressurized fluid bed combustion tends to result in a higher concentration of calcium sulfate fines in the combustion gases (these are a prime cause of turbine fouling). Other variations that must be accommodated in the hot gas clean-up process to reduce gases that will not cause a turbine to deteriorate at an unacceptable rate depend upon, as examples: (a) the specific fuel and acceptor used in the combustor (particularly, the content of trace elements such as lead, vandium, and chromium and the nature of the ash in terms of its content of alkali-containing chlorides, clays, and feldspars); (b) the type of fluidized bed material; and (c) the use of alkali control materials—such as activated alumina and other surface adsorpents and surface getters such as bentonites and other silica-containing materials—in the combustion process.

It is also advantageous that the novel hot gas clean-up apparatus described herein can be operated on a continuous basis. This eliminates the loss of operating time, the reentrainment of separated particles (e.g., by flow reversal to clean the separation device), and the instabilities appurtenant to batch-type separation processes.

A further important advantage of the disclosed apparatus, particularly from the cost viewpoint, is that it has a sharp cut-off in terms of minimum size of the particles that are separated. To illustrate, if $\geq 2$ micron particles are to be removed from gases supplied to a turbine, there is no need to remove smaller particles. A gradual cut-off (this is typical of cyclones, for example) would require that many <2 micron particles unnecessarily be removed from the gases being cleaned to meet the stated goal. Because the herein disclosed apparatus can be easily programmed to separate primarily the >2 particles without the need of separating smaller ones, it eliminates that cost of separating the smaller particles which is unavoidably associated with separation devices having a more gradual cut-off.

Furthermore, the sharp cut-off size can be adjusted readily by changing the dimensions and velocity used in the hot gas impact separator.

As implied above, low capital cost is also an important advantage of the hot gas clean-up apparatus disclosed herein. So are low operating cost and the capability of continuous, unattended operation.

In addition to effectiveness of particle removal with high reproducibility and reliability, the novel hot gas clean-up process disclosed herein has the advantage of exhibiting efficiency toward all types of particles in contrast to competing techniques such as electrostatic precipitation which only inefficiently separate particles that are highly resistive or highly conductive. The disclosed separation technique is also capable of removing significant amounts of alkali metals—and fine particles of additives such as bentonite and activated silica that may be employed to control those metals—as well as other contaminants, several of which were mentioned above.

Also, common and important contaminants such as vanadium and lead are readily removed from the gases being cleaned by the novel impact separation technique disclosed herein. Those elements will typically be present in the gases being cleaned as (typically) molten particles of vandanates and lead silicates. As discussed above, impact separators embodying the principles of the present invention are capable of efficiently separating out particles of that character as well as particles of inert solids and contaminants adsorbed on particulate solids.

OBJECTS OF THE INVENTION

From the foregoing it will be apparent to the reader that one important and primary object of the present invention resides in the provision of novel, improved methods of and apparatus for removing contaminants from hot gases.

More specific, but nevertheless important, objects of the invention reside in the provision of hot gas clean-up methods and apparatus which employ impact separation and:

which are highly efficient;

which, in conjunction with the preceding object, do not suffer a decrease in efficiency under circumstances where other types of gas cleaning devices do;

which are capable of removing both solid particles and other contaminants from the gases being cleaned;

which, in conjunction with the preceding object, are capable of removing alkali metals and contaminants such as vanadium and lead from the gases being cleaned;

which are insensitive to the properties of the contaminants in the gases being cleaned;

which can employ a renewable material that is viscous at operating temperature to trap contaminants separated by inertia from the gases being cleaned, thereby preventing them from re-entering the gas stream;

which, in conjunction with the preceding object, may employ a porous material to increase the amount of contaminants that the material can trap;

which are capable of unattended and continuous, as opposed to batch-type, operation;

which employ a material that is soft at operating temperatures to promote adherence to a trap or collector for contaminants removed from the hot gases being cleaned;

which have small total energy requirements and losses;

which are compact;

which involve only a modest capital investment and modest operating and maintenance costs;

which are capable of producing cleaned gases that will meet federal, state, and local emission standards;

which are flexible in that performance can be readily tailored to match the composition of the gases being cleaned;

which are cost effective in that a sharp cut-off in terms of the minimum size of the particles that are separated is obtained;

which are compatible with other gas cleaning techniques and can accordingly be used in conjunction with them to maximize efficiency, to reduce costs, and for other purposes;

which can be employed to advantage to remove particulate contaminants from the working fluid supplied, to the turbine of a gas turbine engine of the internal combustion type.

Additional objects of the invention as well as other important features and advantages thereof will become apparent to the reader from the appended claims and as the ensuing detailed description and discussion proceeds in conjunction with the accompanying drawings:

BRIEF DESCRIPTION OF THE DRAWINGS

FIG. 1 is a schematic illustration of an internally fired gas turbine engine equipped with a hot gas cleanup system which includes an impact separator embodying the principles of the present invention;

FIG. 2 is an elevation of the impact separator;

FIG. 3 is a transverse section through the impact separator;

FIG. 4 is a partial longitudinal section through the impact separator;

FIG. 5 is a generally schematic view of a second system for feeding a glass to the impact separator to provide a trap for separated foreign substances; and FIG. 6 is a generally diagrammatic view of a pulverized coal combustor equipped with a hot gas impact separator embodying the principles of the present invention.

BEST MODES FOR CARRYING OUT THE INVENTION

Referring now to the drawing, FIG. 1 depicts an internally fired, gas turbine engine 20 in which hot gas cleanup in accord with, and embodying, the principles of the present invention can be employed to advantage. The major components of gas turbine engine 20 include a compressor 22, a pressurized fluid bed combustor 24 for heating the compressor discharge air, a hot gas clean-up system 26 for removing contaminants from the hot gases generated by combustor 24, and a turbine 28 through which the hot gases are then expanded to drive the turbine which is connected through shafts 30 and 32 to a load 34 and to compressor 22. Gas turbine engine 20 also includes an auxiliary combustor 36 which can be used in starting up the turbine engine, for providing a rapid response to load transients, and for increasing the temperature of the cleaned hot gases discharged from hot gas clean-up system 26 before they reach the inlet of turbine 28.

For the most part, the components of the gas turbine engine in question will be described only to the extent necessary for an understanding of the inventions disclosed herein. Components in this category include compressor 22; turbine 28; auxiliary combustor 36, which will typically be fueled by a liquid hydrocarbon; and load 34 which may be, for example, an A.C. generator or alternator. Another component in this category is pressurized fluid bed combustor 24. A number of such combustors have been developed and are currently operating, primarily in the United States and in the United Kingdom.

Referring again to FIG. 1, the remaining major component or subsystem of gas turbine engine 20 is hot gas clean-up system 26 which includes cyclone separators 40 and 42 and a hot gas impact separator 44 employing and constructed in accord with the principles of the present invention.

High temperature cyclone separators 40 and 42 are, again, conventional; and, like the other turbine engine components of that character, they will not be described in detail herein.

As discussed above, turbine service life, in particular, demands that substantially all particles having a size of two microns or larger be removed from a working fluid before it reaches the turbine of a gas turbine engine. In the gas turbine engine illustrated in FIG. 1, the contaminated hot gases discharged from pressurized fluid bed combustor 24 are circulated first through cyclone 40 and then cyclone 42 to remove from the hot gases the bulk of those particles mixed therewith which have a size of ten microns or larger. This reduces the burden on hot gas impact separator 44 which is employed to remove any remaining particles above the desired cut off (for example, $\geq 2$ microns). In doing so, it also removes harmful metal vapor species including the alkali metals, vanadium, and lead. The gas discharged from the impact separator, thus freed of contaminants which are capable of causing erosion, hot corrosion, and fouling, are then circulated to the inlet of turbine 28.

Referring again to the drawing, FIGS. 2-4 disclose in more detail the hot gas impact separator discussed briefly above.

The impact separator includes, among its major components, a pressure or containment vessel 46 with an inlet 48 for dirty gases and an outlet 50 for gases from which contaminants have been removed or separated. Housed in containment vessel 46 are: a separator assembly 52 for turning the contaminated gases entering the separator through an angle that will effect the separation of contaminants from the gases; a rotatable drum 54 on which the separated contaminants are collected; and collection channels 56, 58, and 60 through which the cleaned up gases are conveyed to impact separator outlet 50.

As is best shown in FIGS. 2 and 4, containment vessel 46 has a cylindrical center section 62 and generally hemispherical end sections 64 and 66 which are bolted to center section 62 with gaskets 68 and 70 therebetween to keep gas from leaking from the pressure vessel. Typical hot gas impact separators of the type illustrated in FIGS. 2-4 would have a 12-foot long by 6-foot diameter pressure vessel one inch thick for structural strength and to maintain uniform temperatures. The insulated pressure vessel may be constructed of any structural steel. Although not critical, the other hot components of the impact separator are preferably fabricated from a heat resistant, stainless steel such as type HI or type HH.

As shown in FIGS. 3 and 4, the pressure vessel is internally lined with a refractory, indicated generally by reference character 72. This minimizes the loss of thermal energy from the gases being cleaned while they are in the separator.

The gas inlet 48 and gas outlet 50 are flanged fittings welded or otherwise fixed to the hemispherical end sections 64 and 66 of the pressure vessel. The inlet and outlet, which communicate with cyclone 42 and turbine 28 through ducts 74 and 76, respectively, are also lined with the insulation 72 as are the ducts themselves (the insulation lining those ducts is shown in FIG. 4 but has been omitted from FIG. 2 for the sake of clarity).

Referring now specifically to FIGS. 3 and 4, the rotatable drum 54 on which contaminants separated from the hot gases being cleaned are trapped includes an outer shell 77 supported at its opposite ends by arcuately sectioned, annular spacers 78 and 79 from upstream and downstream support rings 80 and 82. The interior of drum 54 is filled with insulation identified generally by reference character 84.

Drum 54 is fixed to a shaft 86 for rotation therewith by keys 88 and 90 fitted in and extending between the upstream and downstream support rings 80 and 82 of drum 54 and shaft 86.

As shown in FIG. 4, shaft 86 is rotatably supported in containment vessel 46 by bearings 92 and 94 fixed in openings 96 and 98 formed in the semihemispherical end sections 64 and 66 of containment vessel 46.

At the upstream or inlet end of impact separator 44, gases are kept from escaping from the separator by an annular labyrinth seal composed of drum support ring 80 and seal members 100, 102, and 104 with the annular cavity encompassed by those seal members being filled with insulation 106.

At the downstream or outlet 50 end of the separator, a similar function is performed by a labyrinth seal composed of a bellows type seal member 108 surrounding shaft 86, the downstream support ring 82 of separator assembly 52, seal member 110, and an annular seal member 112 with the cavity between the foregoing components being filled with insulation identified by reference character 114.

As discussed above, the outer surface of drum 54 may be coated with a material that is adhesive at operating temperatures to promote the adherence of contaminants separated from the gases being cleaned to the drum although this may not be necessary if the contaminants are sticky at the temperature in the separator or if ash from a strongly fouling coal (one having a softening temperature of not more than ca.1093° C.) is employed to promote adhesion of the separated components to drum 54.

FIGS. 2 and 3 disclose one system for applying the adhesive, typically a powdered glass or vitreous enamel frit, to the drum. That system includes a hopper 116, a pressure lock 118, distribution channels 120 for the powdered material, and a vibrating sifter 122. In operation, valve 124 of lock 118 is opened and valve 126 is closed, allowing the frit to be transfered into the hopper 128 of the lock while keeping the gases in the containment vessel 46 of the separator from escaping. Thereafter, valve 124 is closed and valve 126 is opened, allowing the frit to flow through distribution pipes 120 to vibrating sifter 122 and from the latter through insulated conduits 130 (one of which is shown in FIG. 3) onto drum 54. At the high temperatures existing in the interior of containment vessel 46, the particles of frit will stick to the drum and melt, forming a smooth layer of viscous, adhesive material on the drum.

In this method of applying the adhesive material to drum 54, a frit with a minimum particle size of 0.5 mm is perferably employed to avoid gas entrainment as mentioned above.

Because the vibratory sifter is exposed to the high temperatures within the containment vessel 46 of impact separator 44, air or water cooled, perforated plates 132 and 134 rather than the more conventional screens are employed to meter the frit into transfer conduit 130.

As in a conventional vibrating sifter, one of these two plates is vibrated electromechanically while the other is stationary. To minimize wear, at least the mating surfaces of the two sifter plates are preferably made of an extremely hard material such as a borided steel.

Variations in the specific powdered frit supply system discussed above may of course be employed. For example, a heated roller can be employed behind distribution conduit 130 (i.e., in the direction of rotation of drum 54 therefrom) to regulate the thickness of the coating on drum 54 and to minimize the loss of the frit by preventing its escaping from the drum. Furthermore, such a roller provides a functional seal between the drum and the containment vessel. This is advantageous in that the seal minimizes gas currents in the locations in which the powdered frit is introduced onto drum 54, permitting the frit to be more uniformly distributed on the drum.

In addition, a second, chilled roller can be employed on the upstream side of distribution conduit 130 to level the coating.

Referring again to FIGS. 3 and 4, the separator assembly 52 employed to turn the gases being cleaned and thereby effect the separation of contaminants therefrom includes three perforated plates 136, 138, and 140 surrounding drum 54 in concentric relation to the latter. The perforated plates are bolted to clean gas collection channels 56, 58, and 60 with the leading edge of plate 136 being welded or otherwise fixed to an insulated radiation barrier 142 extending in a generally radial direction from adjacent drum 54 to the shell of containment vessel 46.

This assembly of plates and collection channels is supported from the central section 62 of containment vessel 46 by an annular bracket 144 that is bolted to the seals 68 and 70 between the center and end sections of the containment vessel.

The upstream (or inlet) ends of the three clean gas collection channels 56, 58, and 60 are closed (the closure at that end of channel 58 is shown in FIG. 4 and identified by reference character 146), and channel 58 extends radially from separator assembly 52 to the insulation 72 lining pressure vessel 46. Hot gases introduced into the impact separator through inlet 48 divide and flow around collection channel 58 as shown by bifurcated arrow 148 in FIG. 4 and then through the perforations 150 in plates 136, 138, and 140 which causes the direction of flow of the gases to change as indicated by arrows 152. Because of the inertial forces, and as discussed above, the contaminants associated with the gas however continue in a straighter path, striking the drum 54 that may be coated with viscous, adhesive material to increase retention of these contaminants.

Thereafter, part of the clean gas flows directly into outlet 50 as indicated by arrow 154 in FIG. 4. The remainder of this clean gas flows in a circumferential direction as indicated by arrows 156 in FIG. 3 into collection channels 56, 58, and 60 and then through those channels into outlet 50 as indicated by arrows 158 in FIG. 4.

Typically, for a 2 micron separator, the perforations 150 in the plates 136, 138, and 140 of separator assembly 52 will be 0.12 inch in diameter; and the gases being cleaned will flow through these plates at a velocity of 260 feet per second produced by a one percent pressure drop through the perforations. In this example, contaminants associated with the gases will be subjected to an acceleration of 250,000 g whereas they would see only a 1600 g acceleration force in a typical 36 inch diameter cyclone. Consequently, minus 5 micron particles can be efficiently separated in impact separator 44 whereas they can not be in a conventional cyclone.

It will be apparent from FIG. 3 that the perforated plates 136, 138 and 140 of separator assembly 52 can be easily removed and replaced. As indicated above, this is an important practical feature of the separator. Specifically, and as discussed above, the particle cut-off size for round jet impactors (which the perforations in plates 136, 138, and 140 provide) depends upon the diameter of the jets and the jet velocity. Cut-off size is in turn important for the reasons discussed above.

Both of the factors just discussed—jet velocity (a function of pressure drop through the perforated plates) and jet diameter—can be controlled or varied simply by changing the perforated plates. The stand-off distance between drum 54 and plates 136, 138, and 140 is not critical as long as it does not exceed ten times the diameter of the perforations in the plates. Consequently, the plates can be changed without adjusting the spacing between them and the drum which is obviously advantageous.

Specific parameters that can be employed to obtain wanted cut-off sizes are not part of the present invention. For this reason and as they are well known in the literature such techniques will not be disclosed herein. In this conjunction, the reader may refer, if desired, to Marple et al, "Characteristics of Laminar Jet Impactors," Particle Technology Laboratory, Mechanical Engineering Department, University of Minnesota, Minneapolis, Minn., Environmental Science and Technology, Volume 8, No. 7, July 1974, if desired.

It will also be obvious to those to whom this disclosure is addressed that such blockage of the perforations in plates 136, 138, and 140 as might occur will increase the pressure drop across the perforated plates of separator assembly 52. In contrast to other types of filtering devices, this actually increases the contaminant removal efficiency of separator 44 because the increased pressure drop across plates 136, 138, and 140 results in an increased jet velocity and, consequently, an increase in the forces which accelerate the contaminants toward collector drum 54. Clogging is not a significant problem, however, because the separated contaminants are continuously removed from the separation zone as they are collected and are accordingly not available to clog the perforations in the plates 136, 138, and 140 of impact separation assembly 52.

As discussed above, provision is also made in separator 44 for removing the spent frit (i.e., that frit burdened with contaminants) from drum 54. The preferred mechanism, shown in FIG. 3, is air or water cooled doctor blade 160. The doctor blade is supported from the central section 62 of containment vessel 46 by a mount 162 and an articulated link 164. Movement of the doctor blade toward and away from drum 54 can be effected by rotating an adjusting screw 166.

The insulated (and preferably air cooled) radiation shield 142 mentioned above thermally isolates much of the hot rotating drum 54 from the area in which doctor blade 160 is located. This is an important heat conservation measure; also, this promotes the cooling of the spent frit and thereby facilitates its removal from drum 54 by making it friable and brittle.

To accommodate applications where the material scraped from drum 54 by doctor blade 160 may retain some plasticity, separator 44 is preferably provided with the Geneva mechanism identified by reference character 168. This mechanism includes a four-armed wheel 170 rotatably supported on a driven shaft 172 and extending the length of doctor blade 160 and a parallel driving shaft 174 to which a longitudinally extending, radially oriented, knife-like drive member 176 is fixed. Each rotation of shaft 174 indexes wheel 170 through one-fourth of a revolution in the direction indicated by arrow 178 in FIG. 3. As this occurs, one of the four arms 180 of wheel 170 scrapes against the doctor blade, removing any adherent material from it. Should any material adhere to the wheel, it will in turn be scraped off by the knife-like driving member 176. The components of the Geneva mechanism are preferably cooled as by circulating water through them because frits of the type typically employed as adhesives in separator 44 will not stick to cooled metals.

An insulated door 182 is located in containment vessel 46 opposite doctor blade 160 and Geneva mechanism 168 to provide access to those mechanisms when necessary.

Referring now to FIGS. 2 and 3, the contaminant burdened material removed from drum 54 by the mechanism jsut described falls through a chute 184 bounded by radiation shield 142 and an insulated wall 186 into a crusher 188 which may consist of two contrarotating corrugated rolls (not shown). From the crusher the comminuted material is discharged from the separator 44 through a pressure lock 190 which may duplicate lock 118. This material, which consists largely of glass cemented ash, can be used for road fill or in breeze blocks, for example; or it can simply be dumped as it does not pose a serious environmental problem.

Many modifications may of course be made in the impact separator within the scope of the present invention. For example, the mechanism provided for removing the spent glass or other sticking agent from drum 54 can be operated intermittently rather than continuously; and the entire layer of material on the drum can be removed rather than that part of the layer burdened with contaminants.

And, as discussed above, the adhesive material may alternatively be applied to drum 54 of the illustrated separator by flame spraying. While it is a perhaps more energy intensive technique, the penalty in energy may not be unacceptable because low energy flame spray guns can be employed as the temperature in the containment vessel of the separator may be 871° C. or higher. The particular flame spray gun that is employed is not critical, and a number of such guns are commercially available. Consequently, the flame spray guns (identified by reference character 191 in FIG. 1) will not be illustrated or described in detail herein.

Yet another system for applying the adhesive material or sticking agent to drum 54 is illustrated in FIG. 5 and identified by reference character 192. System 192 includes a hopper 194 which extends through the wall of the containment vessel middle section 62 and is generally coincident in length with collector drum 54. At its inner end within the containment vessel, hopper 194 terminates in an elongated nozzle 196 located adjacent drum 54.

Powdered glass or other frit is supplied to hopper 194 as by an auger conveyor 198. This frit flows downwardly through hopper 194 past thermal radiation shields 200 and 202 to the lower end of the hopper where the frit is melted. Typically, the temperature in this locale will not be sufficient to melt the frit. Additional thermal energy can, however, be provided by an immersion heater 204 in the lower end of the hopper.

Hopper 194 is pressurized, typically by supplying it with compressed air through fitting 206. The pressure can be regulated to control the application of viscous material to the drum.

Referring again to the drawing, we pointed out above that the collector of a hot gas impact separator embodying the principles of the present invention does not necessarily have to be coated to effect the adherence of particulate material to the collector. This is true, for example, in the pulverized coal combustor illustrated in FIG. 6 and identified by reference character 208.

Turning now to that figure, the details of combustor 208 are not part of the present invention and will accordingly not be described herein. Briefly, however, combustor 208 includes a vertically extending combustion chamber 210 housed in a casing 212 and surrounded by a heat exchanger 214. Primary combustion air and pulverized coal are introduced through conduits 216 and 218 into a swirler 220 mounted in the top wall of combustion chamber 210. From the swirler, a combustible mixture of pulverized coal and primary air is discharged downwardly into the combustion chamber and burned.

Dilution air is introduced via duct 222 into a plenum 224 between heat exchanger 214 and combustor casing 212 and preheated. The preheated air then flows into combustion chamber 210 through dilution air ports 226 to complete the combustion process.

Hot gases generated by the combustion of the coal-air mixture in combustion chamber 210 exit from the combustion chamber through outlet 228. Particulate contaminants are removed from these gases by a hot gas impact separator 230 constructed in accord with the principles of the present invention.

The major components of the hot gas impact separator are an apertured arch 232 which spans the combustion chamber; a rotatably mounted collector drum 234, generally coincident in length with arch 232; and a similarly dimensioned doctor blade 236 for removing collected contaminants from the drum. The latter are discharged from combustor 208 through a diagrammatically illustrated lock 238.

Temperatures in the vicinity of the hot gas impact separator may reach and exceed 1371° C. At these temperatures; the ash generated in combustion chamber 210 is sufficiently sticky to adhere to the bare drum 234, eliminating the complexities and cost associated with an appropriate system for applying a coating to the collector drum.

It will be apparent from the foregoing that the arch 232 and drum 234 of impact separator 230 operate in an extremely hostile environment. Consequently, these components will preferably be made of a silicon carbide ceramic because of the excellent strength at high temperature, erosion resistance, and resistance to thermal shock those materials have.

It is believed that the operation of impact separator 230 will be apparent from the preceding textual material and from FIG. 6. Briefly, however, hot gases generated in combustion chamber 210 flow through the apertures 240 in arch 232, thereby undergoing a sharp turn as indicated by arrow 242. As in the embodiments of the invention discussed above, particles carried by these gases cannot make the turn and, therefore, impact upon, and adhere to, collector drum 234 and are subsequently removed from the latter by doctor blade 236.

Advantage may be taken of the principles of the present invention in many circumstances besides those expressly identified and alluded to above. For example, the pressurized fluid bed combustor of a system such as that illustrated in FIG. 1 can be fired with fuels other than coal, and other types of combustors can be employed. Furthermore, the cyclones can be eliminated or replaced with other gas clearing devices, depending upon the nature of the hot gases being cleaned and/or the requirements imposed upon the hot gases. And, as discussed above, the impact separator does not necessarily have to be employed in an internally fired gas turbine engine system; it can in general be employed wherever a need for cleaning hot gases exists. Also, in the hot gas impact separator embodiments discussed above, apertured plates or arches are employed to effect a sharp turn of the gases being cleaned and thereby separate the particulate contaminants from them. The same goal can instead be accomplished, for example, by accelerating the hot gases through the passages between adjacent tubes of an array of closely spaced, parallel tubes.

Furthermore, that which has gone before shows that the invention may be embodied in forms other than those described and illustrated without departing from the spirit or essential characteristics of the invention.

The present embodiments of the invention are therefore to be considered in all respects as illustrative and not restrictive, the scope of the invention being indicated by the appended claims rather than by the foregoing description; and all changes which come within the meaning and range of equivalency of the claims which follow are therefore intended to be embraced therein.

What is claimed is:

1. Hot gas clean-up apparatus of the impact separation type comprising: a vessel; means for introducing gases to be cleaned into said vessel; means for trapping contaminants separated from said gases, said contaminants trapping means being housed in a collection zone in said vessel and being impactable by said contaminants as they are separated from said hot gases; means for so effecting a change in the direction of flow of the gases introduced into said vessel that contaminants mixed therewith will be their inertia impact against and adhere to the impactable means provided to trap said contaminants; and means via which gases from which contaminants have been thus separated can exit from said vessel, the means for introducing gases being cleaned into said vessel being so structured as to cause said gases to move through said collection zone from one side of said zone to the other and the means for effecting the change in the direction of flow of said gases being structured to accommodate that movement of the gases through the removal zone while effecting that change in the direction of flow of the gases which results in the impingement of the contaminanats on the means which is impactable by the contaminants.

2. Hot gas clean-up apparatus as defined in claim 1 wherein the means for trapping contaminants comprises a drum and wherein the apparatus includes means for rotatably supporting said drum in said vessel and means for rotating said drum.

3. A hot gas clean-up system which includes impact separation type hot gas clean-up apparatus as defined in claim 1 and at least one cyclone ahead of and in line with said impact separation type hot gas clean-up apparatus for removing particles of larger size from the gases subjected to cleaning before said gases reach said impact separation type hot gas clean-up apparatus.

4. Hot gas clean-up apparatus which comprises: a containment vessel; means dividing the interior of said vessel into physically isolated collection and removal zones; a collector housed in said containment vessel; means for effecting a movement of said collector in said vessel such that the collector surface moves into and through said collection zone and then into said physically isolated removal zone; means for effecting a flow of gases to be cleaned into said vessel and through said collection zone; means in said vessel for bending the gases to be cleaned and moving through said collection zone along a path such that particulate contaminants associated therewith will impact on and adhere to the collector surface and thereby become separated from the gases being cleaned; an exit from the removal zone and containment vessel for the cleaned gases; and means for removing from the collector surface the collected contaminants adhered thereto.

5. Hot gas clean-up apparatus as defined in claim 4 which includes means for applying to said collector surface before it arrives at said collection zone a material which is adhesive at operating temperatures and therefore capable of adhering to said collector surface the contaminants impacting thereagainst.

6. Hot gas clean-up apparatus which comprises: a containment vessel; means dividing the interior of said vessel into a collection zone and a removal zone; a collector housed in said containment vessel which comprises a rotatable drum; means for effecting a movement of said collector in said vessel such that the collector surface moves into and through said collection zone and then into said removal zone; means in said vessel for bending the gases to be cleaned in said collection zone through a path such that particulate contaminants associated therewith will impact on and adhere to the collector surface and thereby become separated from the gas being cleaned, said means for bending said gases comprising: perforated plates concentrically spaced from and around said drum, there being perforations through said plate oriented orthogonally with respect to the axis of rotation of the drum; means for effecting a flow of the gases to be cleaned through said containment vessel between said plates and said containment vessel; and means communicating with the spaces between said plates and said drum via which the gases from which contaminants have been separated can exit from said collection zone; an exit from the containment vessel for the cleaned gases; and means in said removal zone for removing from the collector surface the collected contaminants adhered thereto.

7. Apparatus as defined in claim 6 wherein the means communicating with the spaces between said perforated plates and said drum comprises at least one collection channel disposed between adjacent ones of said perforated plates and means providing an outlet in communication with said channel.

8. Apparatus as defined in claim 7 wherein said collection channel extends in the same direction and from end-to-end of said drum and communicates with said outlet at the downstream end of the containment apparatus, there being a closure at the upstream end of said collection channel to keep cleaned gases from escaping therefrom.

9. Hot gas clean-up apparatus as defined in claim 6 wherein said perforated plates are interchangeable and wherein said apparatus comprises means for changing the pressure drop across said plates, whereby the operation of said apparatus can be altered to meet the demands placed upon it.

10. Hot gas clean-up apparatus of the impact separation type comprising: a vessel; means for introducing gases to be cleaned into said vessel; means for trapping contaminants separated from said gases, said contaminants trapping means being housed in said vessel and including a first means that is impactable by said contaminants as they are seperated from said hot gases and a second means for applying a material that is adhesive at the operating temperature of the apparatus to said first means to promote the adherence of the contaminants thereto, said second means comprising means for sifting said material onto said first means; means for so effecting a change in the direction of flow of the gases introduced into said vessel that contaminants mixed therewith will by their inertia impact against and adhere to the impactable means provided to trap said contaminants; and means via which gases from which contaminants have been thus separated can exit from said vessel.

11. Hot gas clean-up apparatus of the impact separation type comprising: a vessel; means for introducing gases to be cleaned into said vessel; means for trapping contaminants separated from said gases, said contaminants trapping means being housed in said vessel and including a first means that is impactable by said contaminants as they are separated from said hot gases and a second means for applying a material that is adhesive at the operating temperature of the apparatus to said first means to promote the adherence of the contaminants thereto, said second means comprising flame spraying means; means for so effecting a change in the direction of flow of the gases introduced into said vessel that contaminants mixed therewith will by their inertia impact against and adhere to the impactable means provided to trap said contaminants; and means via which gases from which contaminants have been thus separated can exit from said vessel.

12. Hot gas clean-up apparatus of the impact separation type comprising: a vessel means; means for introducing gases to be cleaned into said vessel; means for trapping contaminants separated from said gases, said contaminants trapping means being housed in said vessel and including a first means that is impactable by said contaminants as they are separated from said hot gases and a second means for applying a material that is adhesive at the operating temperature of the apparatus to said first means to promote the adherence of the contaminants thereto, said second means comprising a supply hopper for said material and a nozzle type outlet from said hooper adjacent said first means for forcing said material under pressure from said hooper through said outlet and onto said first means; means for so effecting a change in the direction of flow of the gases introduced into said vessel that contaminants mixed therewith will be their inertia impact against and adhere to the impactable means provided to trap said contaminants; and means via which gases from which contaminants have been thus separated can exit from said vessel.

13. Hot gas clean-up apparatus as defined in claim 12 wherein said second means includes heating means in said hopper to melt said material.

14. Hot gas clean-up apparatus as defined in claim 12 wherein said second means includes means for supplying said material in dry granular form to said hopper, 15. Hot gas clean-up apparatus of the impact separation type comprising: a vessel; means for introducing gases to be cleaned into said vessel; means for trapping contaminants separated from said gases, said contaminants trapping means being housed in said vessel and including a first means that is impactable by said contaminants as they are separated from said hot gases and a second means for applying a material that is adhesive at the operating temperature of the apparatus to said first means to promote the adherence of the contaminants thereto; means for so effecting a change in the direction of flow of the gases introduced into said vessel that contaminants mixed therewith will be their inertia impact against and adhere to the impactable means provided to trap said contaminants; means via which gases from which contaminants have been thus separated can exit from said vessel; and an adjustable, fluid cooled knife means for separating contaminants and spent material from said first means.

16. Hot gas clean-up apparatus as defined in claim 15 together with co-operating rotating members for removing contaminants and spent material separated from said first means by said knife means from the latter and/or for breaking up said contaminants and spent material.

17. Hot gas clean-up apparatus defined in claim 15 which includes thermal barrier means disposed in said vessel between said second means and said knife means, said barrier means extending between said vessel and said first means and from end-to-end of the latter.

18. Hot gas clean-up apparatus as defined in claim 15 together with a first pressure lock through which the material employed to promote adherence of the contaminants to said first means can be introduced into the vessel of the apparatus and a second pressure lock through which spent material and contaminants can be discharged therefrom.

19. Hot gas clean-up apparatus which comprises: a containment vessel; means dividing the interior of said vessel into a collection zone and a removal zone; a collector housed in said containment vessel; means for effecting a movement of said collector in said vessel such that the collector surface move into and through said collection zone and then into said removal zone; means in said vessel for bending the gases to be cleaned in said collection zone through a path such that particulate contaminants associated therewith will impact on and adhere to the collector surface and thereby become separated from the gases being cleaned; an exit from the removal zone and containment vessel for the cleaned gases; means for applying to said collector surface before it arrives at said collection zone a material which is adhesive at operating temperatures and therefore capable of adhering to said collector surface the contaminants impacting thereagainst; and means for removing from said collector surface the adhesive material and the contaminants trapped therein, said last-mentioned means comprising a fluid cooled blade.

20. Hot gas clean-up apparatus as defined in claim 19 which includes means for removing from said fluid cooled blade adhesive material and contaminants which are adhered thereto, said last-mentioned means comprising: scraper means and means for so rotating said scraper means relative to said fluid cooled blade as to cause said scraper means to dislodge adherent adhesive material and contaminants from said blade as the scraper means is rotated relative to that blade.

21. Hot gas clean-up apparatus as defined in claim 20 which includes drive means which is so constructed as to rotate said scraper means and, at the same time, dislodge adherent adhesive material and contaminants from the scraper means.

* * * * *